United States Patent
Reese et al.

[11] 3,847,586
[45] Nov. 12, 1974

[54] APPARATUS FOR BENDING GLASS SHEETS TO SHARP CURVATURES

[75] Inventors: Thomas J. Reese, Sarver; George R. Claassen; Melvin W. Tobin, both of New Kensington, all of Pa.

[73] Assignee: PPG Industries, Inc., Pittsburgh, Pa.

[22] Filed: Dec. 18, 1973

[21] Appl. No.: 425,918

[52] U.S. Cl. ............ 65/290, 65/107, 65/291, 65/DIG. 4
[51] Int. Cl. ............ C03b 23/02
[58] Field of Search ........ 65/DIG. 4, 107, 286, 287, 65/289, 290, 291

[56] References Cited
UNITED STATES PATENTS
| | | | |
|---|---|---|---|
| 2,223,123 | 11/1940 | Owen | 65/107 X |
| 3,233,996 | 2/1966 | Cox et al. | 65/107 |
| 3,762,903 | 10/1973 | Hamilton | 65/107 |

*Primary Examiner*—Arthur D. Kellogg
*Attorney, Agent, or Firm*—Edward I. Mates

[57] ABSTRACT

Apparatus for bending one or more glass sheets to a sharp bend by a combination of overall heating and localized heating using a glass bending mold comprising a removable electroconductive heating element in the form of a ribbon. Means is provided for maintaining the ribbon in contact with a glass sheet surface from slightly inward of one side to slightly inward of the other side of the glass sheet along a straight line of sharp bending desired when the glass sheet sags to conform to the shape of a mold. Additional means is provided to protect the glass sheet from undue penetration by the ribbon, particularly at the glass sheet edge portions.

8 Claims, 4 Drawing Figures

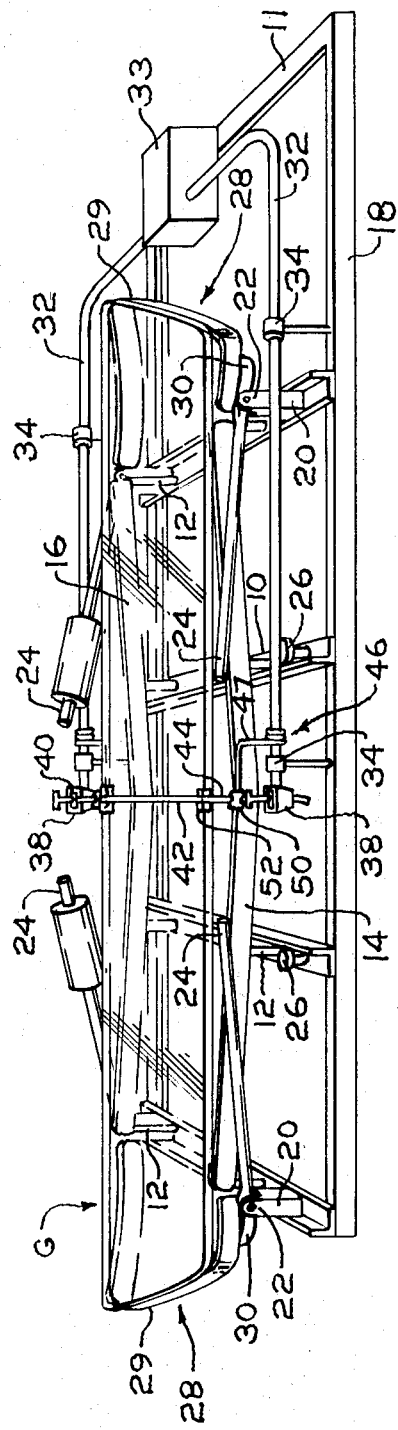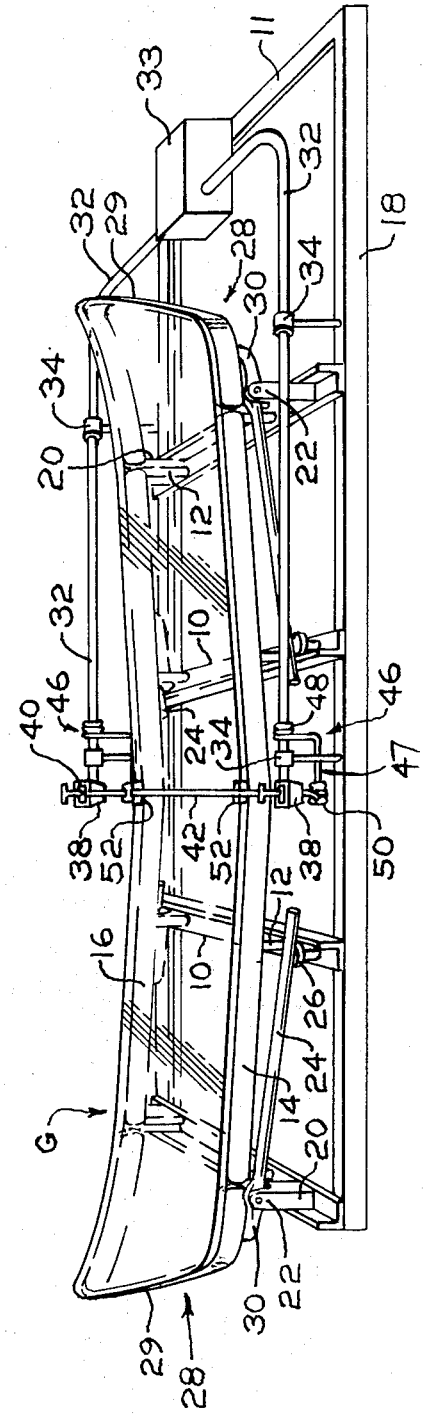

3,847,586

APPARATUS FOR BENDING GLASS SHEETS TO SHARP CURVATURES

BACKGROUND OF THE INVENTION

Automobile stylists have been interested in shaping glass sheets to conform to the shape of the automobile in which the glass is mounted. Recently, there has been interest in providing the automobile with one or more sharply bent lines or creases extending lengthwise of the automobile such as along the hood, the roof, and/or even the rear trunk. Therefore, it has become desirable to develop method and apparatus for bending glass sheets to be used in automobile windshields, backlights, sidelights and even roof lights and rear quarter windows to provide a sharply bent crease extending completely across the width of the bent glass sheet to provide a continuation of the line of sharp bending in the automobile body.

One of the techniques for producing such a line of sharp bending is shown in U.S. Pat. No. 3,762,903 to Harold E. Hamilton. In this patent, an elongated line of electroconductive frit of ceramic silver or other suitable electroconductive material is applied as one or more layers along the line desired for sharp bending to one or more surfaces of one or more glass sheets to be shaped on a bending mold. The glass sheet is initially heated to a temperature slightly below the glass softening point that is sufficient to fuse the frit along the line of sharp bending. Electrodes are held against the opposite ends of the electroconductive frit and a voltage is impressed between the electrodes. The impressed voltage passes current through the frit, thereby heating the frit electrically, which in turn, raises the glass temperature along the line of sharp bending. The glass sags rapidly along the line of sharp bending until it conforms to the shaping surface of a V-shaped outline mold. The frit remains as an opaque line extending across a dimension of the ultimate product, because it is very difficult to remove a fused ceramic frit.

U.S. Pat. No. 3,762,904 to Harold E. Hamilton, Robert P. Bamford and Paul Pastorek forms a groove in a glass surface along a line of sharp bending, a line of electroconductive frit that is fusable onto the glass being either in the groove or in alignment with the groove along the surface of the glass opposite the grooved surface. Here, too, the electroconductive frit fuses to the glass to provide an opaque line. Furthermore, while grooves accelerate the rate at which the glass sheet sags along the line of sharp bending, grooving weakens the glass and preferably should be avoided.

U.S. Pat. application Ser. No. 239,032 to Robert A. Jansson and Thomas J. Reese now U.S. Pat. No. 3,795,501 proposes the use of a narrow, elongated strip of electroconductive material which may be removed from the line of sharp bending after the glass sheet is shaped. The present invention provides improvements in apparatus that uses a removable electroconductive ribbon to bend a glass sheet sharply along a line of sharp bending.

SUMMARY OF THE INVENTION

The present invention provides glass bending apparatus employing a ribbon of electroconductive material with means for holding the ribbon in fixed position relative to a portion of the glass sheet surface to be bent sharply as the latter sags toward its bent configuration and means to protect portions of the glass from undue penetration by said ribbon. The ribbon holding means is preferably in the form of novel electrode means that hold spaced portions of the ribbon in a vertical plane intersecting the line of sharp bending. A preferred embodiment of this invention comprises a bending mold of the outline type adapted to support a glass sheet for bending by the gravity sag method, a first electrode located on one side of said mold, a second electrode located on said other side of said mold, means adapted to connect said electrodes to an electrical power source to apply a potential difference between said electrodes, means for holding spaced portions of a flexible, electroconductive ribbon in electrically contacting relation to each of said electrodes in a vertical plane extending through said line of sharp bending for supporting said electroconductive ribbon in said vertical plane and across said mold in contact with the upper surface of a flat glass sheet mounted on said mold for bending, means located in said vertical plane intermediate one or the other lateral side of said mold and said ribbon holding means adjacent to said side of said mold and movable into a position to engage the upper surface of said ribbon in said vertical plane to apply a light downward force against said ribbon to hold said ribbon in contact with the upper surface of said glass sheet along the line of sharp bending as the latter sags, and additional means disposed in said vertical plane between said upper surface engagement means and said supported glass sheet in position to engage the undersurface of said ribbon inward of said means engaging the ribbon at its upper surface to space said ribbon from each edge portion of said glass sheet along the line of sharp bending. The means engaging the upper surface of the ribbon, also referred to as a hold-down means, is supported in movable relation relative to said ribbon so that it is capable of providing a light, downward force on the ribbon intermediate the ribbon holding means and an adjacent glass sheet edge as the glass sags downward.

The electrodes according to an illustrative embodiment of the present invention are box-like members having openings at the top and bottom thereof to facilitate the receipt of an end portion of electroconductive ribbon and the holding means is weighted and provided with a shape complementary to the shape of the inside walls of the box-like electrode member to insure that an end of the ribbon is clamped rapidly in electroconductive relation to one of said electrodes. However, any electrode structure capable of rapid engagement or disengagement of a ribbon may be used. A similar arrangement may be provided to clamp the other end of the electro-conductive ribbon to the electrode at the opposite side of the mold or the other end of the ribbon may be permanently attached to the other electrode, so that means is provided for rapidly clamping at least one end portion of the ribbon to an electrode. Rapid clamping and unclamping facilitates high speed production.

The electrodes, hold-down means and means to engage the under-surface of the ribbon to space the ribbon a short distance from the glass sheet edges are all located in a common vertical plane that intersects the line of sharp bending desired in the glass in an illustrative embodiment of this invention. Nevertheless, if desired, the electrodes need not be in said vertical plane provided ribbon holding means are provided along said vertical plane on opposite sides of the mold outside said hold-down means. Nevertheless, it is convenient to use electrodes in said vertical plane to provide both electrical contact for the ribbon and as ribbon holding means to anchor the position of spaced portions of the ribbon in said vertical plane so that said hold-down means maintains the ribbon in continuous contact with the upper surface of the glass sheet in said vertical plane as the glass sheet sags along the line of sharp bending.

The details of the present invention will be understood better in the light of a description of an illustrative preferred embodiment that follows. In the drawings that form part of the description, like reference numbers refer to like structural elements.

BRIEF DESCRIPTION OF THE DRAWINGS

FIG. 1 is a front view of an outline, sectionalized glass sheet bending mold with a glass sheet mounted on the mold preparatory to bending, showing how a strip of electroconductive material is arranged relative to a glass sheet to be bent to provide additional localized heating while shaping the glass sheet according to one embodiment of the present invention;

FIG. 2 is a view similar to that of FIG. 1, showing the relation of the glass sheet to the glass shaping mold after bending is completed.

DESCRIPTION OF THE PREFERRED EMBODIMENTS

Figure 3:
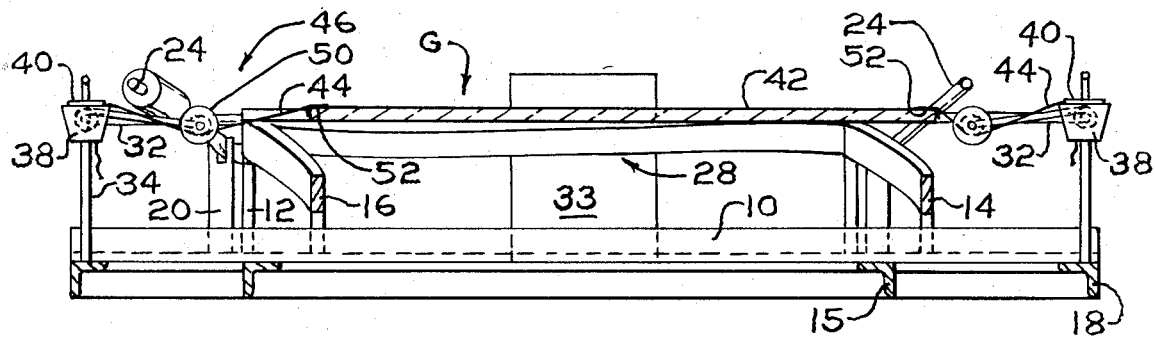
FIGS. 3 and 4 are fragmentary cross-sectional views of a mold loaded with a glass sheet before and after shaping, respectively, showing a ribbon of electroconductive material arranged across the glass sheet width facing the line of sharp bending, hold-down means to hold said ribbon against the upper surface of the glass sheet along the line of sharp bending and means engaging the under surface of the ribbon along the vertical plane of sharp bending to maintain said ribbon in closely spaced relation to glass edges before and during the shaping cycle according to the present invention.
Figure 4:
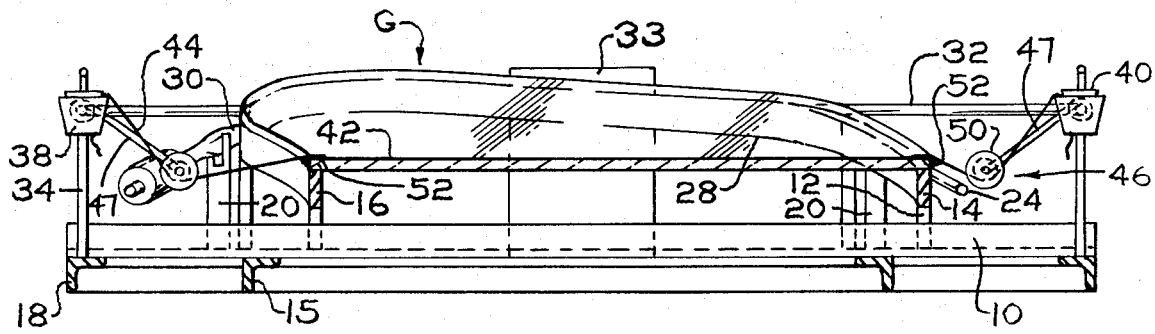

The drawings show a typical embodiment of apparatus for use in bending a glass sheet G to shape the glass sheet by gravity sagging using a combination of general lehr heating and localized electrical resistance heating. The mold upon which the glass sheet is shaped comprises a plurality of cross bars 10 and an end cross bar 11. Certain of the cross bars 10 support a vertical post 12 near each longitudinal end thereof. The vertical posts 12 along one side of the mold support a shaping rail 14 extending along one longitudinal side edge of the mold and having an upper edge glass receiving surface of V-shaped configuration while the vertical posts 12 along the other longitudinal side edge of the mold supports a shaping rail 16 extending along the opposite longitudinal side edge of the mold and whose upper edge forms a surface of similar V-shaped configuration. A longitudinal member 18 interconnects each end of the cross bars 10 and end bar 11 to a corresponding end of each other cross bar and end bar. Thus, the cross bars 10, the end bar 11 and the longitudinal members 18 form a frame like structure reinforced by intermediate bars adapted to be supported on a mold carriage (not shown) for movement in a direction transverse to the length of the glass sheet supported on the mold for movement through a conventional glass bending lehr.

Laterally outside the vertical posts 12 that support the shaping rails 16 and 14, there are provided four hinge support posts 20, each of which supports a hinge 22. One of the elements of each of the hinges 22 comprises a lever arm 24 adaptable for pivoting in a substantially vertical plane about an axis defined by the hinge 22. A stop member 26 is provided for engagement by the inner end of each lever arm 24.

In addition to the shaping rails 14 and 16 that extend longitudinally of the mold, there are also provided two end mold sections 28. Each of the end mold sections comprises an end mold section shaping rail 29 whose upper edge forms a surface conforming in elevation and outline to the shape desired for one or the other longitudinal end portions of the glass sheet to be shaped on said mold. Each end mold section 28 also comprises an outrigger 30 rigidly attached to the under surface of each inner end of each end mold section shaping rail 29 and extending longitudinally inward of the mold toward one of the hinges 22 to which it is pivotally attached in rigid relationship to a corresponding lever arm 24. Thus, the lever arms 24 and the end mold sections 28 pivot about axes of pivoting defined by the respective hinges 22 from a flat glass receiving position depicted in FIG. 1 to a closed mold position depicted in FIG. 2.

The mold as described thus far comprises a typical sectionalized bending mold of the outline type in which center section shaping rails 14 and 16 provided intermediate support for one or more flat glass sheets supported thereon for bending in cooperation with the outer ends of the end mold section rails 29. The lever arms 24 have their center of gravity disposed inward of the respective hinges 22 so that, as the supported glass softens, they cause the end mold sections 28 to pivot from their spread position in which they support the flat glass sheet into a closed position where their upper edges form continuations of the shaping surfaces provided along the upper edges of the shaping rails 14 and 16, thus forming a sectionalized, outline surface that receives the supported glass sheet near its periphery and supports the glass sheet in its desired shape.

The present apparatus also includes means to provide electrical energy to a narrow elongated portion of a glass sheet supported on the mold for bending. The electrical energy is preferably used to bend the glass sheet sharply along a line of sharp bending before the final bend is imparted to the glass when the glass is shaped in regions other than along the line of sharp bending.

The present apparatus provides a pair of electrical leads 32, one end of which extends longitudinally of the mold along a line outwardly and slightly below shaping rail 14 and the other end of which extends along a parallel line outwardly and slightly below shaping rail 16. The leads are connected at one end thereof to a junction box 33 supported by end bar 11. Lead support means 34 of insulated material are carried by the longitudinal members 18 to support the leads 32 outside and below the mold. The electrical leads are low resistance elements, such as stainless steel rods, that are suitably mounted in the insulated lead support means where needed to avoid shorting with the mold structure. Each electrical lead is connected near one end remote from the junction box 33 to one or the other of a pair of electrodes 38.

Although any electrode structure having quick-clamping and unclamping characteristics is preferred for the electrodes, a particular structure is provided in the illustrative embodiment. In the latter, each electrode 38 is in the form of a box having an upper opening and a lower opening and at least one downwardly and inwardly tapering side wall, preferably oppositely spaced side walls that are downwardly and inwardly tapered to receive a wedge-shaped element 40.

The wedged shaped weighted electrode element 40 has a shape conforming to that of the inner walls of electrode 38 so that it is adapted to be received into each box-like electrode 38 to clamp an end portion of a conductive ribbon 42 which is mounted across the upper surface of the glass sheet supported on the mold. The other end portion of the ribbon may be similarly engaged between another wedged shaped weighted electrode element 40 and the other electrode 38 located adjacent the opposite longitudinal side edge of the mold when the weighted electrode element is introduced into the electrode 38 disposed on the other lateral side of the mold as depicted in the drawings. Each element 40 and electrode 38 cooperates to form a ribbon holding means. One of the ribbon holding means may be permanently attached to the ribbon 42.

While ribbon holding means must be provided in the vertical plane intersecting the line of sharp bending on opposite sides of the mold, it is understood that the ribbon holding means may or may not include the electrodes 38. It is preferred that the electrodes 38 form part of the ribbon holding means 38, 40 so as to minimize mold structure needed to support the ribbon 42.

The ribbon 42 is mounted between the ribbon holding means across the upper surface of the glass sheet along the line desired for sharp bending. An extended portion 44 at each end of the ribbon 42 is made slightly longer than the distance between the places where the ribbon extends from each side of a flat glass sheet mounted on the mold for bending and the places where the ribbon 42 is clamped to each electrode 38. The ribbon is thus free to follow the upper surface of the glass sheet downward as the latter sags to conform to the shaping surface of the mold along the line of sharp bending.

The mold is also provided with means adapted to engage the upper surface of the ribbon between at least one side of the mold and the adjacent ribbon holding means. The means to engage the upper surface of the ribbon comprises a light-weight hold down means 46 according to a preferred embodiment of the invention. The light-weight hold-down means 46 comprises an angular wire 47 having a series of loops 48 at one end rotatably mounted around an insulation sleeve enclosing lead 32 and a ceramic spool 50 at the free end of the wire. A typical ceramic material is an aluminum-silica cement that withstands thermal shock. A typical wire is made of stainless steel ⅛ inch diameter stock having a radial leg extending about 3 inches from the loops 48 and turning to form a horizontal leg about 5 inches long that supports the ceramic spool 50 in fixed position therealong. The total weight of the hold down device 46 including the radial leg and the spool support leg only of the wire 47 plus that of the spool 50 preferably is less than 50 grams. The hold-down means 46 is mounted in pivotal cantilever fashion with respect to the support therefor on the insulator for lead 32 to pivot downwardly and inwardly in the vertical plane intersecting the line of sharp bending so as to enable the spool 50 to make contact lightly but firmly against the upper surface of one or the other extending portions 44 of the conductive ribbon 42 between the ribbon holding means 38, 40 and the adjacent portion of the mold that supports the edge portion of the glass when bent. Means is provided to fix the position of the loops 48 relative to the insulation sleeve so that spool 50 intersects the vertical plane intersecting the line of sharp bending.

As an alternative, each hold down means 46 may be supported either pivotally or slidably relative to any convenient portion of the mold structure so that it is capable of contacting the upper edge of the ribbon in the vertical plane that intersects the line of sharp bending. In the illustrative embodiment, the wire 47 helps to support the means 46 in the desired location in said vertical plane.

Additional ribbon engaging means 52, shown as a small piece of tape, having a thickness in the range of 5 to 50 mils and preferably not exceeding 20 mils, folded over each opposite edge of the supported glass sheet along the line of sharp bending for a distance of approximately ½ to 3 times the glass thickness, engages the under surface of the ribbon and separates the ribbon from the glass edge portions a short distance to reduce penetration of the ribbon into the glass sheet at its edges and along the marginal portion of the upper surface adjacent the edge when the glass sheet softens locally along the line of sharp bending during application of electrical power to the ribbon. Thus, as the glass sheet changes shape during the bending operation, the light-weight hold-down means 46 cooperates with the ribbon engaging means 52 to maintain the electroconductive ribbon 42 in contact with the upper surface of the glass sheet from a location slightly inside one side edge to slightly inside the other side edge and also causes the ribbon 42 to be maintained in taut relation over the upper glass sheet surface as the latter is shaped. If convenient, a second lightweight hold-down means 46 similar in construction to that of the first means 46 may be provided on the other side of the mold. Of course, the additional ribbon engaging means 52 that engages the under surface of the ribbon to space the opposite glass edge portion slightly from the ribbon is located inside the second hold-down means 46.

The weight of the hold-down means 46 including that of the supporting wire should be the minimum necessary to maintain the ribbon 42 in contact with the glass across the entire surface from one edge portion covered by one ribbon engaging means 52 to the other edge portion covered by the other ribbon engaging means 52 and to keep the ribbon 42 straight despite thermal expansion. A total weight of 1 to 6 ounces is usually sufficient for this purpose for use with glass sheets having widths up to about 3 feet and nominal thicknesses up to ¼ inch.

The means 52 engaging the under surface of the ribbon, which also serves as glass engaging means, may be a folded strip of fiberglass tape 5 to 50 mils thick with an upper horizontal portion extending from the glass sheet edge to ⅛ inch to ½ inch inward thereof (preferably about ¼ inch for glass having ¼ inch thickness) to provide mechanical protection and thermal insulation from the heated ribbon for the glass edge portion to which it is applied. Other flexible materials resistant to the high temperatures of the glass bending cycle may also be used. Furthermore, other materials may be used as the ribbon engaging means 52, such as short strips of graphite tape 5 to 30 mils thick folded over the glass edge portions for an inwardly extending distance of ⅛ inch to ½ inch at each edge to separate the glass edges from direct contact with the metal ribbon 42. The graphite tape also provides mechanical protection for the glass edge as it is flexible and moderates the heating effect of the ribbon as graphite is electroconductive and reduces the effective resistance per unit length of the electroconductive heating ribbon at the edge portion to which the flexible graphite tape is applied, thus reducing the rate of electrical resistance heating applied to the opposite edge portions when graphite tape is used as the ribbon engaging means 52, thus increasing the resistance to penetration of the ribbon 42 into the edge portions of the glass.

The apparatus previously described is capable of bending a pair of glass sheets or of supporting a single glass sheet for bending and tempering when it is desired to bend a glass sheet sharply to produce a socalled V-bend from edge to edge of the sheet. Flexible metal strips, preferably ribbons of nickel chromium alloys have been used to bend one or more glass sheets sharply from edge to edge. The ribbon is applied against the upper surface of a single glass sheet when a single glass sheet is bent or against the upper surface of a lower glass sheet and the lower surface of an upper glass sheet simultaneously when a pair of glass sheets is bent simultaneously. It is customary to apply a line of a parting material such as a finely divided mica between the ribbon and the glass to avoid fusion during the bending cycle when a metal ribbon is used.

Typical ribbons of nickel-chromium alloy for imparting a sharp bend are ⅛ inch to ¼ inch wide and 0.006 to 0.001 inches thick. A ribbon ¼ inch wide has a resistance per unit length of 0.336 ohms per foot for 0.006 inch thickness and 2.12 ohms per foot for 0.001 inch thickness.

Sheets of float glass having a nominal thickness of ¼ inch and ranging in thickness from 7/32 inch to ¼ inch were successfully bent to complex shapes including a sharp line of bending extending completely across the sheet using an outline mold to support the glass in a single stage furnace whose roof heating elements were set at 1280°F. to 1320°F for 1 to 3 minutes. After exposure to the furnace atmosphere for the times indicated, with an electroconductive ribbon extending across the width of the glass sheet from an electrode on one side of the sheet to another electrode on the other side of the sheet, electric power was applied to the ribbon according to a voltage and current cycle indicated while the glass remained on the mold within the single stage furnace. The glass was removed after the time indicated and inspected. The results are reported in the material that follows.

In the first experiments, wherein no hold-down means were used when electric power was applied to the ribbon, the ribbon curled up at the side edges of the glass and moved horizontally with respect to the glass surface. The glass bent sharply about a curved line that was not in the vertical plane of the line of sharp bending desired.

Weights of approximately 50 grams were mounted on the ribbon between each electrode and each glass edge in further experiments. The weighted ribbons penetrated into the edges and the nichrome ribbon fused to the glass. The addition of a thin strip of graphite tape folded over each edge portion of the glass along the line of sharp bending reduced fusion and penetration at the edges. Reducing the weight of the hold-down means 46 to less than 30 grams and using such light-weight hold-down means with tapes 10 mils to 20 mils thick folded around the edge portion provided good sharp bends along the line desired for sharp bending with virtually no penetration at the edges or elsewhere along the line of sharp bending. The use of finely divided mica or talc as a parting material along the line of contact with the metal ribbon avoided fusion. The parting material was removed after bending.

The following experiments were performed to bend float glass sheets having a nominal thickness of ¼ inch to V-shaped configurations using a nickel-chromium alloy ribbon ¼ inch wide and 3 mils thick and an idle furnace temperature of 1300°F.

|    | DURATION | VOLTS | AMPERES | COMMENTS |
|---|---|---|---|---|
| 1. | 60 sec. | — | — | No hold down, ribbon lifted and moved relative to glass. |
|    | 120 sec. | 45 | 20 | |
|    | 25 sec. | — | — | |
| 2. | 90 sec. | — | — | Hold down devices (50 grams) caused ribbon to fuse to glass. |
|    | 60 sec. | 71 | 29 | |
|    | 120 sec. | — | — | |
| 3. | 120 sec. | — | — | Lighter hold-down used, less fusion. |
|    | 45 sec. | (Not measured) | 30 | |
|    | 108 sec. | — | — | |
| 4. | 150 sec. | — | — | Fusion lighter yet with less time and same weight for hold-down as 3. |
|    | 30 sec. | 74 | 30 | |
|    | 101 sec. | — | — | |
| 5. | 180 sec. | — | — | Very little fusion |
|    | 40 sec. | 58 | 25 | |
|    | 55 sec. | — | — | |
| 6. | 180 sec. | — | — | Light fusion. |
|    | 35 sec. | 61 | 25 | |
|    | 55 sec. | — | — | |

| | DURATION | VOLTS | AMPERES | COMMENTS |
|---|---|---|---|---|
| 7. | 180 sec.<br>35 sec.<br>45 sec. | —<br>45<br>— | —<br>20<br>— | Hold down devices weighted 50 grams. Little or no fusion. Glass did not sag all the way to mold rail. |
| 8. | 150 sec.<br>75 sec.<br>47 sec. | —<br>46<br>— | —<br>20<br>— | V ok but slightly rounded when end portions were shaped to complete bend |
| 9. | 150 sec.<br>80 sec.<br>34 sec. | —<br>46<br>— | —<br>20<br>— | V somewhat better than previous bend. Fiber glass tape applied to edges. |
| 10. | 120 sec.<br>150 sec.<br>22 sec. | —<br>32<br>— | —<br>15<br>— | Good "V". |
| 11. | 150 sec.<br>35 sec.<br>70 sec. | —<br>76<br>— | —<br>30<br>— | Best "V" yet for metal ribbon bending. |

The following experiments were performed using a furnace preset to 1320°F. and a metal heating ribbon of nickel chromium alloy ¼ inch wide and 3 mils thick engaged at its upper surface with a pivotal hold-down means.

| | DURATION | VOLTS | AMPERES | COMMENTS |
|---|---|---|---|---|
| 12. | 120 sec.<br>30 sec.<br>30 sec.<br>8 sec. | —<br>10.5<br>28<br>33 | —<br>8<br>10<br>12 | Only wire (about 13 grams) applied as pivotal hold-down without weights. Ribbon did not remain in contact with glass |
| 13. | 120 sec.<br>30 sec.<br>15 sec.<br>15 sec.<br>15 sec. | —<br>28<br>33<br>43<br>— | —<br>10<br>12<br>16<br>— | 50 gram weights plus wire applied at each end. Ribbon fused to glass edge and in spots across glass. |

Talc was sprayed along the line of sharp bending and nickel-chromium alloy ribbons ⅛ inch wide and 0.0056 inch thick were used. The furnace remained preset at 1320°F. for the following experiments.

| | DURATION | VOLTS | AMPERES | COMMENTS |
|---|---|---|---|---|
| 14. | 120 sec.<br>30 sec.<br>15 sec.<br>40 sec.<br>10 sec. | —<br>28<br>34<br>42<br>— | —<br>8<br>10<br>12<br>— | Wire weight plus 30 grams weight at one side and plus 17.5 gram weight at other side. Good V formed with no fusion. |
| 15. | 60 sec.<br>30 sec.<br>34 sec.<br>60 sec.<br>26 sec. | —<br>30<br>34<br>42<br>— | —<br>8<br>10<br>12<br>— | Carbon strips applied to both edges. No penetration. Good V-bend |
| 16. | 60 sec.<br>60 sec.<br>60 sec.<br>15 sec. | —<br>36<br>45<br>— | —<br>10<br>12<br>— | Another good V-bend. Carbon strips and weights used as in 15. |
| 17. | 120 sec.<br>40 sec.<br>15 sec. | —<br>85<br>— | —<br>14<br>— | Very good V-bend. No fusion. Carbon strips and weights used again. |

The use of electroconductive materials other than ribbons of nickel-chromium alloys or carbon or graphite tapes as the electroconductive ribbons 42 is not precluded by the present invention. Various materials that do not deteriorate at temperatures met in the bending cycle, do not react chemically with glass, that retain their flexibility, that are ductile and have a melting point higher than the softening point of glass may also be used. The ribbon engaging means 52 is preferably of a material that retains its integrity, that is compressible and flexible, that does not react chemically with glass or the electroconductive ribbon and provides at least mechanical reinforcement for the glass sheet edges along the line of sharp bending, spaces the ribbon a slight distance (preferably not more than 50 mils) from each glass edge portion, and does not interfere with the linear contact between the ribbon and the glass interior of the marginal portions. While carbon or graphite tape has been mentioned, thin fiber glass tape or other flexible materials having the other requisite properties mentioned above may also be used as the ribbon engaging means 52. Carbon tape is electroconductive, does not stick to heat-softened glass so that it behaves as a good parting material where applied between the glass and the metal ribbon, and provides reduced electrical resistance at the edges so that the ribbon 42 does not conduct as much heat into the glass edge portions as it does along the line of sharp bending intermediate the glass edge portions. Fiber-glass tape provides some thermal insulation as well as flexible mechanical protection for the glass edges.

The location of the electrodes 38 establishes the location of the ribbon 42 in the vertical plane that intersects the line of sharp bending. The use of the hold-down means 46 applies tension to the ribbon 42 that maintains the latter in the vertical plane intersecting the line of sharp bending and in contact with the upper surface of the glass sheet as the latter sags. The ribbon engaging means 52 provides at least a flexible mechanical protection for the glass edge portions and either thermal insulation or a local decrease in the electrical heating effect that reduces the tendency of the ribbon to penetrate or to fuse into the heat-softened glass. The combination of these elements insures that the glass sheet is bent sharply along a straight line that conforms to the line of bending desired and that does not meander.

It is understood that the ribbon holding means located in the vertical plane defining the axis of sharp bending may comprise elements other than the electrodes. However, for convenience, it is preferred to use electrodes that are readily assembled and disassembled as the ribbon holding means to simplify the mold construction. It is also understood that a single hold-down means 46 that serves as means to engage the upper surface of the ribbon may suffice in bending relatively narrow glass sheets and a pair of hold-down means, one for each side edge, may be needed in bending wider glass sheets.

The form of the invention described and illustrated represents an illustrative embodiment of the present invention. It is understood that various changes may be made without departing from the spirit of the invention defined by the claimed subject matter that follows.

We claim:

1. Apparatus for shaping a glass sheet to a shape including a line of sharp curvature extending from one side edge to the other of said sheet comprising an outline mold of the skeleton type having an upper shaping surface conforming to the shape desired for said glass sheet after bending, a first electrode located on one side of said mold, a second electrode located on the other side of said mold, means adapted to couple said electrodes to an electrical power source, means for holding a flexible electroconductive ribbon in electroconductive relation to each of said electrodes and in fixed positions outside said mold in a vertical plane extending through said line of sharp bending for supporting said electroconductive ribbon in said vertical plane and across said mold in contact with the upper surface of a glass sheet mounted on said mold for bending, hold-down means located in said vertical plane intermediate one lateral side of said mold and said ribbon holding means to engage the upper surface of said ribbon in said vertical plane between a side of the mold and said ribbon holding means to apply a light downward force against said ribbon to hold said ribbon in contact with the upper surface of said glass sheet along the line of sharp bending as the latter sags, and means disposed in said vertical plane to engage the under surface of said ribbon inward of said position where said hold-down means engages said upper surface of said ribbon to maintain said ribbon in closely spaced relation to said glass sheet edges as the glass sheet sags along said line of sharp bending.

2. Apparatus as in claim 1, further including a second hold-down means to engage the upper surface of said ribbon, said second hold-down means being located in said vertical plane intermediate the other lateral side of said mold and the other ribbon holding means.

3. Apparatus as in claim 1, wherein said means to engage the under surface of said ribbon is positioned to engage each edge of said glass sheet along said line of sharp bending.

4. Apparatus as in claim 1, wherein at least one of said electrodes comprises a weighted clamping member adapted to rigidly clamp said flexible ribbon between said electrode and said clamping member in said vertical plane that intersects the line of sharp bending.

5. Apparatus as in claim 4, wherein said electrode is in the shape of a box having an opening in its top and bottom to receive an end portion of said ribbon, said box having a side wall that tapers downwardly and inwardly and said weighted clamping member has a shape adapted to be received in wedging relation against said box when said weighted clamping member is moved downward through said top opening.

6. Apparatus as in claim 1, wherein said hold-down means to engage the upper surface of said ribbon is pivotally mounted about a horizontal axis of pivoting extending longitudinally of the mold laterally outside said mold to pivot downward against the upper surface of said ribbon.

7. Apparatus as in claim 3, wherein said means to engage said glass edge is composed of graphite tape having a maximum thickness of 30 mils.

8. Apparatus as in claim 3, wherein said means to engage said glass edge is composed of fiber glass tape having a maximum thickness of 50 mils.

* * * * *